(12) United States Patent
Knight

(10) Patent No.: US 6,738,645 B2
(45) Date of Patent: May 18, 2004

(54) RADIO BASE STATION

(75) Inventor: Clifford Lee Knight, Cape Coral, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 374 days.

(21) Appl. No.: 09/822,125

(22) Filed: Mar. 30, 2001

(65) Prior Publication Data

US 2002/0142806 A1 Oct. 3, 2002

(51) Int. Cl.[7] .............. H04B 1/38; H04M 1/00; H94Q 7/00
(52) U.S. Cl. .............. 455/561; 455/560; 455/423; 340/539.26; 340/539.27; 340/539.28
(58) Field of Search .............. 455/561, 560, 455/90, 423, 424, 440; 340/601, 522, 539.26, 539.27, 539.28

(56) References Cited

U.S. PATENT DOCUMENTS

| | | | |
|---|---|---|---|
| 4,387,368 A | 6/1983 | Day, III et al. | 340/539 |
| 5,801,632 A | 9/1998 | Opal | 340/585 |
| 5,934,079 A * | 8/1999 | Han et al. | 62/3.2 |
| 6,067,030 A * | 5/2000 | Burnett et al. | 340/870.05 |
| 6,094,567 A * | 7/2000 | Berglund | 455/115.4 |
| 6,164,129 A | 12/2000 | Shin et al. | 73/170.16 |
| 6,211,791 B1 * | 4/2001 | Ponce de Leon et al. | 340/601 |

FOREIGN PATENT DOCUMENTS

WO    WO 00/72285 A1    11/2000    .......... G08B/29/00

OTHER PUBLICATIONS

PCT Search Report mailed Sep. 3, 2002 in PCT Ser. No. PCT/US02/05892.

* cited by examiner

*Primary Examiner*—Vivian Chin
*Assistant Examiner*—Yuwen Pan
(74) *Attorney, Agent, or Firm*—Cantor Colburn LLP (57) ABSTRACT

A radio base station for a wireless communication system is disclosed. The radio base station has wireless communication equipment, an enclosure, an air conditioning system, and a notification system. The wireless communication equipment receives, processes, and transmits frequencies in at least one range of 806–960 MHz, 1710–1855 MHz, 2500–2690 MHz, and 2.4 GHz–2.5 GHz. The enclosure has an interior region, and the enclosure houses the wireless communication equipment within the interior region. The air conditioning system cools the interior region. The notification system monitors the air conditioning system, and the notification system communicates with a communications network and sends a notification when the air conditioning system operates. The notification system thus provides an alert when the air conditioning system is cooling the wireless communication equipment.

28 Claims, 10 Drawing Sheets

RADIO BASE STATION

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to wireless communications and, more particularly, to radio base stations that monitor cooling systems.

2. Description of the Related Art

Wireless communication has experienced explosive growth. In just a few years cellular telephone usage has soared, and growth continues as wireless Internet access improves. This explosive growth has revolutionized data and voice communication, and manufacturers are continually striving to improve wireless equipment to meet the explosive growth.

Radio base stations are one example of continuously improving wireless equipment. Radio base stations are self-contained enclosures that house transmitters, receivers, and other wireless communication equipment. While radio base stations were originally designed for indoor installations, explosive growth has forced manufacturers to design outdoor radio base stations. These outdoor radio base stations allow wireless service providers to improve service by expanding the coverage area.

These outdoor radio base stations, however, are prone to overheating. The wireless communication equipment generates high heat loads within the radio base station. Solar heat loads may also exacerbate internal temperatures within the radio base station. If the wireless communication equipment is exposed to temperatures lying outside an operating range, the equipment may fail from thermal stress. Some radio base stations, therefore, are equipped with air conditioners to keep the wireless communication equipment within the operating range. If the air conditioners fail, the wireless communication equipment overheats and fails. When the wireless communication equipment fails, wireless service is interrupted. An interruption in service irritates customers, disrupts daily business activities, and reduces revenue for the service provider.

Thermal stress is such a concern that some radio base stations have two air conditioners. Air conditioning unit #1 is generally designated a "lead" unit, while air conditioning unit #2 is a "lag" unit. Unit #1 is then the primary cooling unit, while unit #2 is a secondary cooling unit. Unit #1 runs for a preset time and maintains the wireless communication equipment at a preset temperature. Unit #1, for example, may run for twenty four (24) hours and have its thermostat cool to a temperature of eighty degrees (80°). At the end of the preset time, say twenty four (24) hours, the two air conditioning units swap functions. Unit #2 now becomes the lead primary air conditioner, while unit #1 becomes the lagging secondary air conditioner. This "lead-lag" operating scenario prevents either air conditioner from continually running and from prematurely wearing out.

The lead-lag operating scenario is also meant to improve cooling of the wireless communication equipment. If the lead air conditioning unit #1 experiences a problem—such as overloading, too much internal heat, or even failure—the lag air conditioning unit #2 then operates as a backup. If unit #1, for example, has its thermostat set at eighty degrees (80°), unit #2 would initiate cooling if the internal temperature rose to eighty five degrees (85°). The lag unit thus acts as a backup to the lead unit and helps prevent thermal overloads.

This lead-lag operating scenario, however, does not provide adequate notice of air conditioning failures. A field engineer must know, for example, when the lag air conditioning unit is operating. If the lag unit #2 is operating, then the lag unit #2 may be trying to overcome a heavy heat load. The lag unit #2, worse, may indicate the lead unit #1 has failed. If the lead unit #1 has failed, the lag unit #2 will constantly operate to cool the wireless communication equipment. The lag unit #2, the only working air conditioner, will eventually wear out and fail. The internal temperatures quickly rise, a high temperature alarm trips, and the wireless communication equipment shuts down and causes a communication outage. Only then are the field engineers alerted to the overheating problem. All the while the communication outage is disrupting personal and business activities.

The lack of adequate notice of air conditioning failures cascades to other problems. If the lead unit #1 has failed, and the lag unit #2 continually operates to failure, the wireless service equipment has shut down. Thousands of revenue-generating calls are lost per hour. An air conditioning specialist must be called to investigate the failure. Field engineers must accompany the air conditioning specialist. If the failure occurs on a weekend, a holiday, or an evening, overtime costs apply. Because both air conditioning units have failed, replacement parts, or even replacement units, could cost thousands of dollars. While the air conditioning specialist initiates a repair, the field engineer is setting up floor fans to cool the wireless communication equipment. These fans, however, draw dust and dirt and contaminate the wireless communication equipment. The lack of adequate notice of air conditioning failures, thus, cascades to multiple other problems.

There is, accordingly, a need in the art for a radio base station that has a reduced rate of thermal stress failures, a radio base station that alerts engineers of air conditioning problems or unusual operating conditions, and, yet, a radio base station design that can resolve the prior art problems without extensive revisions or large expenses.

BRIEF SUMMARY OF THE INVENTION

The aforementioned problems are minimized by a radio base station that monitors its air conditioning system. This radio base station continuously monitors the air conditioning system in real-time. The radio base station alerts field personnel, engineers, or any other person when the air conditioning system operates. If the radio base station has two air conditioning systems, operating in the "lead-lag" scenario, the radio base station may send an alert when either air conditioning system operates. This radio base station design, therefore, can notify personnel when the lagging, back-up air conditioning system operates, possibly indicating a problem with the lead, primary air conditioning system. The radio base station may then alert field engineers before both air conditioning systems prematurely fail.

The radio base station may also alert engineers and field personnel to other indications of the air conditioning system. The radio base station may send alerts indicating normal operation, errors, or even failures in the air conditioning system. The radio base station, for example, may simply communicate whether the air conditioning system is running. The radio base station could also communicate how much electricity is being used by the air conditioning system. If too much electricity is being consumed, the air conditioning system may have encountered an unusual operating condition. The radio base station could also monitor refrigerant pressures within the air conditioning system. A low refrigerant pressure could indicate a leak in a condenser/evaporator coil. The radio base station may monitor ambient temperatures and indicate unusual cold weather operation. If, for example, the air conditioning system is operating during cold ambient temperatures, ice may form on the condenser. The radio base station, in short, may send any status information, fault or error information, alarm information, or any other information useful for monitoring the operation of the air conditioning system.

BRIEF DESCRIPTION OF THE SEVERAL VIEWS OF THE DRAWINGS

These and other features, aspects, and advantages of the present invention are better understood when the following Detailed Description of the Invention is read with reference to the accompanying drawings, wherein.

DETAILED DESCRIPTION OF THE INVENTION

The present invention is a radio base station for a wireless communication system. The radio base station has wireless communication equipment, an enclosure housing the wireless communication equipment, an air conditioning system cooling the wireless communication equipment, and a monitoring and notification system monitoring the air conditioning system. The wireless communication equipment receives, processes, and transmits frequencies in at least one range of 806–960 MHz, 1710–1855 MHz, 2500–2690 MHz, and 2.4 GHz–2.5 GHz. The enclosure has an interior region, and the enclosure houses the wireless communication equipment within the interior region. The air conditioning system cools the interior region. The monitoring and notification system monitors the air conditioning system, communicates with a communications network, and sends a notification when the air conditioning system operates. The monitoring and notification system thus provides an alert when the air conditioning system is cooling the wireless communication equipment. The notification may be at least one of a pager notification, an email notification, a telephone call notification, and a mobile telephone call notification.

An alternate embodiment is also disclosed. This alternate embodiment also describes a radio base station for a wireless communication system. Wireless communication equipment receives, processes, and transmits frequencies in at least one range of 806–960 MHz, 1710–1855 MHz, 2500–2690 MHz, and 2.4 GHz–2.5 GHz. An enclosure has an interior region, with the enclosure housing the wireless communication equipment within the interior region. A first air conditioning system and a second air conditioning system cools the interior region. A monitoring and notification system monitors at least one of the first air conditioning system and the second air conditioning system. The monitoring and notification system communicates with a communications network and sends a notification when at least one of i) the first air conditioning system operates and ii) the second air conditioning system operates. The monitoring and notification system provides an alert when the wireless communication equipment is cooled.

Still a further embodiment is disclosed. This embodiment has wireless communication equipment receiving, processing, and transmitting frequencies in at least one range of 806–960 MHz, 1710–1855 MHz, 2500–2690 MHz, and 2.4 GHz–2.5 GHz. An enclosure has an interior region, and the enclosure houses the wireless communication equipment within the interior region. A first air conditioning system and a second air conditioning system cools the interior region. A monitoring and notification system monitors the second air conditioning system. The monitoring and notification system communicates with a communications network and sends a notification when the second air conditioning system operates. The monitoring and notification system provides an alert when the second air conditioning system cools the wireless communication equipment.

Another embodiment also describes a radio base station for a wireless communication system. Wireless communication equipment receive, process, and transmit frequencies in at least one range of 806–960 MHz, 1710–1855 MHz, 2500–2690 MHz, and 2.4 GHz–2.5 GHz. An enclosure has an interior region, and the enclosure houses the wireless communication equipment within the interior region. A first and a second air conditioning system cools the interior region. A pager system is coupled to a communications network. A relay assembly is coupled to the first air conditioning system and to the second air conditioning system. The relay assembly moves a set of contacts when the second air conditioning system operates. The relay assembly initiates the pager system when the second air conditioning system operates. The pager system thus communicates a page notification along the communications network when the second air conditioning system cools the wireless communication equipment.

A process is also disclosed. The process describes notifying personnel when an air conditioning system cools a prefabricated radio base station. The process detects when the air conditioning system cools the prefabricated radio base station. The prefabricated radio base station having an enclosure housing wireless communication equipment for receiving, processing, and transmitting frequencies in at least one range of 806–960 MHz, 1710–1855 MHz, 2500–2690 MHz, and 2.4 GHz–2.5 GHz. If operation of the air conditioning system is detected, the process describes communicating with a communications network and sending a notification. The notification includes at least one of an email, a page, a telephone call, and a mobile telephone call. The notification alerts the personnel that the air conditioning system is cooling the radio base station.

Another embodiment of the process is disclosed. Here the process detects when a second air conditioning system operates to cool the prefabricated radio base station. The second air conditioning system operates as a back-up to a first air conditioning system. The prefabricated radio base station includes an enclosure housing wireless communication equipment for receiving, processing, and transmitting frequencies in at least one range of 806–960 MHz, 1710–1855 MHz, 2500–2690 MHz, and 2.4 GHz–2.5 GHz. If the second air conditioning system is operating, the process communicates with a communications network and sends a notification when the second air conditioning system operates. The notification includes at least one of an email, a page, a telephone call, and a mobile telephone call. The notification alerts the personnel that the second air conditioning system is operating, thus indicating a potential problem with the first air conditioning system.

Figure 1:
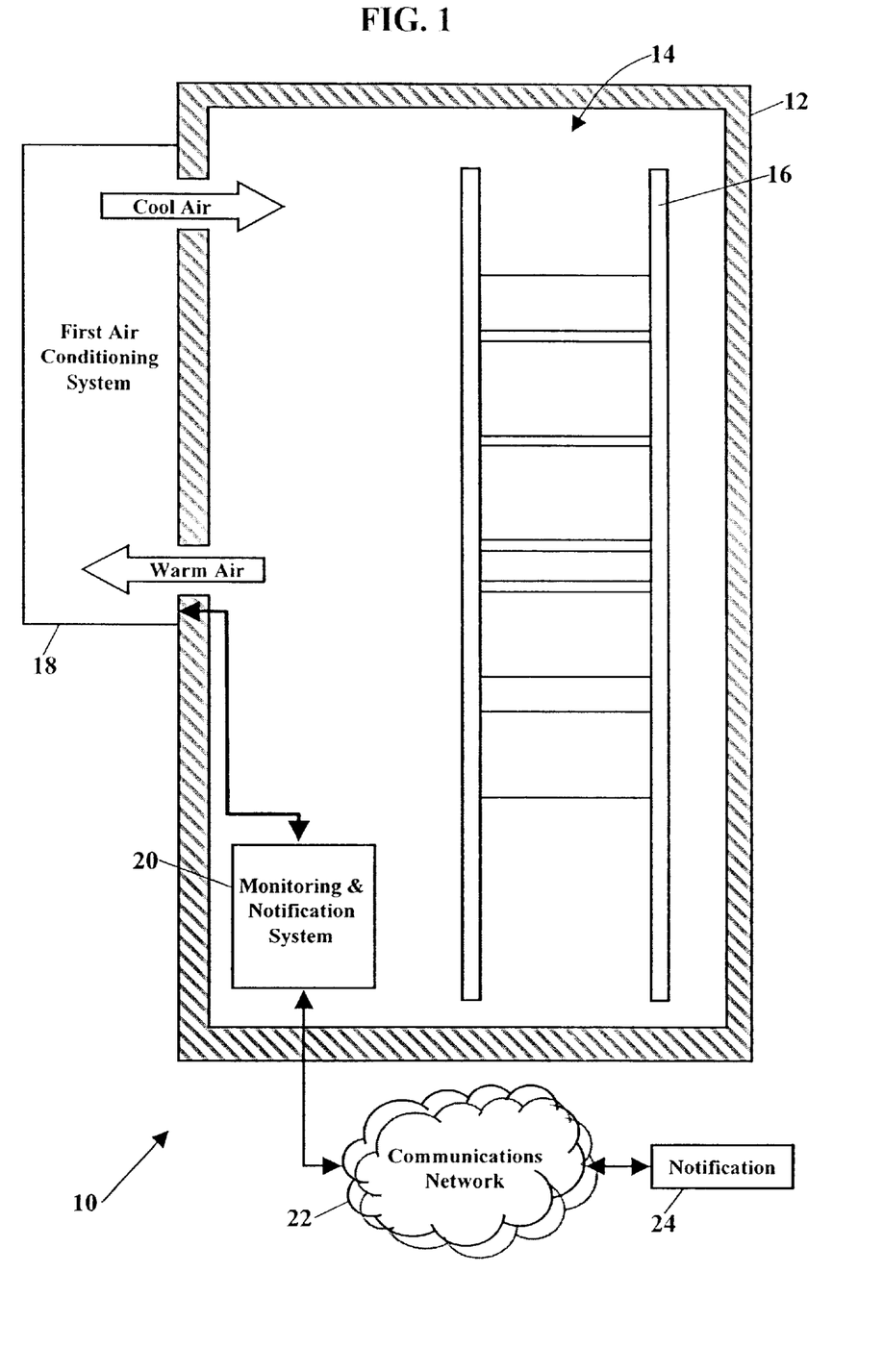
FIG. 1 is a sectional view of a radio base station.

FIG. 1 is a sectional view of a prefabricated radio base station 10. A prefabricated radio base station is a self-contained cell site for mobile communications. The prefabricated radio base station houses electronic equipment for wireless communications. The prefabricated radio base station is normally purchased from a supplier, trucked to the desired location, and installed upon a concrete slab. Once electrical power is supplied, antennas are hooked to the electronic equipment, and a connection to a mobile switch is established, the prefabricated radio base station is ready to receive and to transmit wireless telephone calls.

FIG. 1 shows the radio base station 10 has an enclosure 12. The enclosure 12 has an interior region 14. The sectioned enclosure 12 exposes rack-mounted wireless communication equipment 16 and a first air conditioning system 18. The rack-mounted wireless communication equipment 16 is housed within the interior region 14 of the enclosure 12. As those of ordinary skill in the art have long understood, the first air conditioning system 18 operates to cool the interior region 14 of the enclosure 12. Because the operation of the first air conditioning system 18 is well understood, the first air conditioning system 18 is simply shown as drawing in warm air and exhausting cool air. A monitoring and notification system 20 is coupled to the air conditioning system 18. The monitoring and notification system 20 monitors the operation of the air conditioning system 18. The monitoring and notification system 20 communicates with a communications network 22 and is programmed to send a notification 24 when the air conditioning system 18 operates, fails, or experiences a fault.

Figure 2:
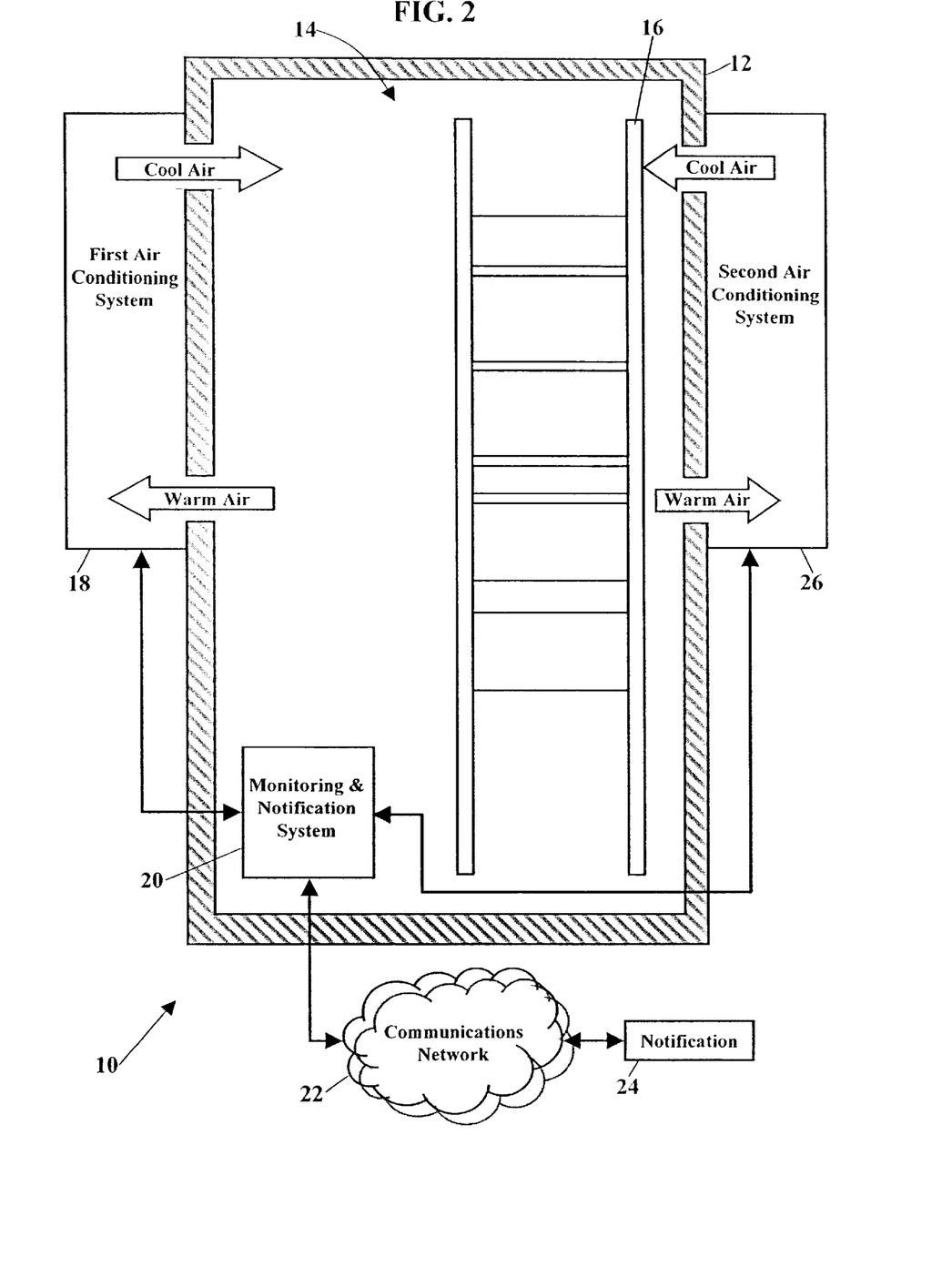
FIG. 2 is also a sectional view of an alternative embodiment of the radio base station.

FIG. 2 is also a sectional view of an alternative embodiment of the radio base station 10. Here a second air conditioning system 26 also cools the interior region 14. The monitoring and notification system 20 monitors at least one of the first air conditioning system 18 and the second air conditioning system 26. The monitoring and notification system 20 communicates with the communications network 22 and sends the notification 24 when the first air conditioning system 18 and/or the second air conditioning system 26 operates, fails, or experiences a fault. The monitoring and notification system 20, therefore, may alert personnel when both the first air conditioning system 18 and the second air conditioning system 26 are operating, indicating a high heat load within the radio base station 10.

Figure 3:
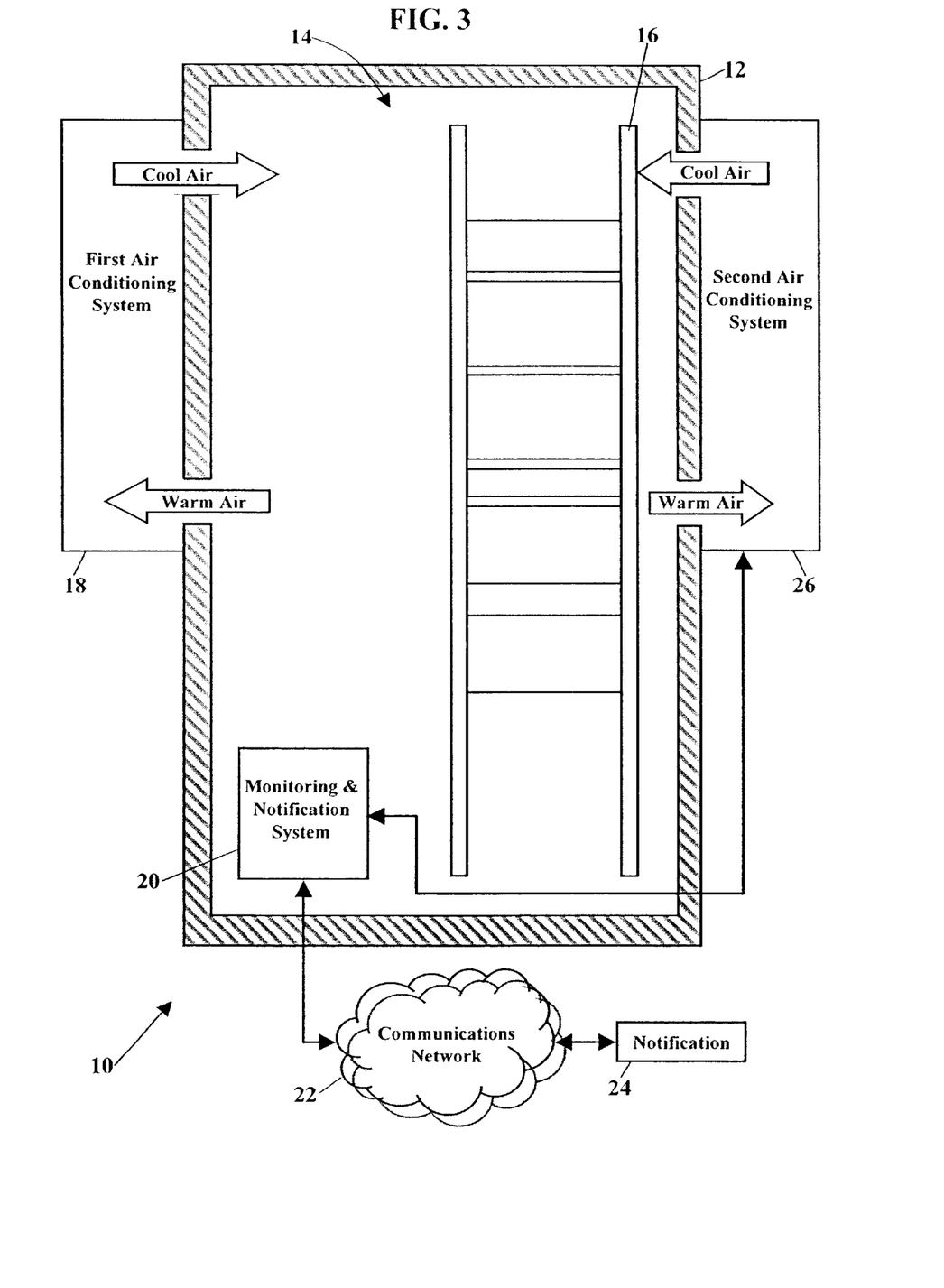
FIG. 3 is a sectional view of another embodiment of the radio base station.

FIG. 3 is again a sectional view of another embodiment of the radio base station 10. The monitoring and notification system 20 of this embodiment only monitors the second air conditioning system 26. The monitoring and notification system 20 communicates with the communications network 22 and sends the notification 24 when the second air conditioning system 26 operates, fails, or experiences a fault. Because the monitoring and notification system 20 only monitors the second air conditioning system 26, this embodiment is preferable for the "lead-lag" operating scenario. The first air conditioning system 18 is the "lead" unit, while the second air conditioning system 26 is the "lag" unit. If the lag second air conditioning system 26 is operating, then the first air conditioning system 18 must be experiencing some problem. Either the heat load is too great for the first air conditioning system 18 to overcome, or the first air conditioning system 18 has failed. The monitoring and notification system 20 sends the notification 24 and alerts field personnel that the second air conditioning system is operating. Field personnel receive the notification 24 and immediately know a problem may exist. The field personnel may then inspect the radio base station 10 before both the first air conditioning system 18 and the second air conditioning system 26 experience a catastrophic failure.

Figure 4:
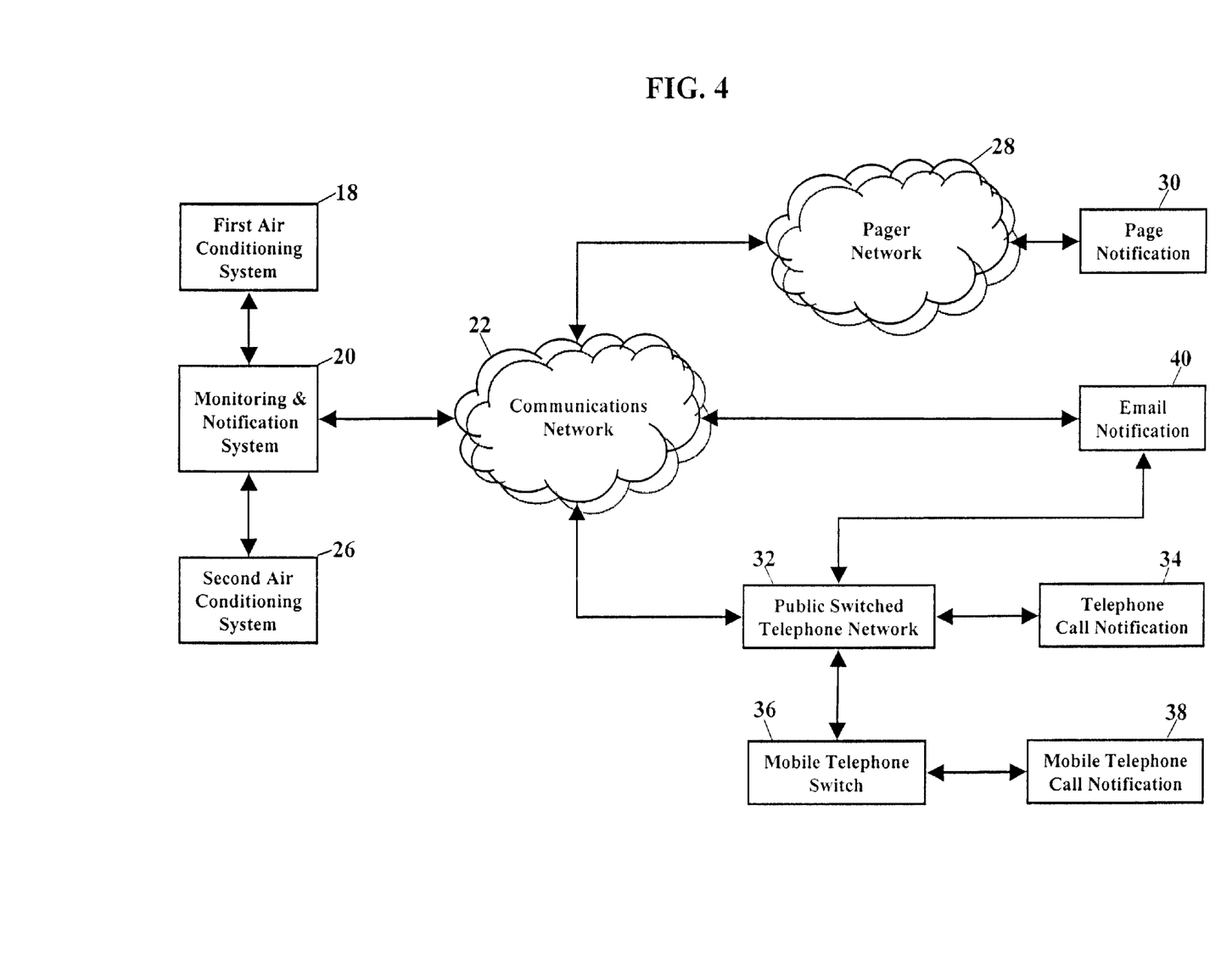
FIG. 4 is a schematic drawing describing various types of notifications that may be communicated.

FIG. 4 is a schematic drawing describing various types of notifications that may be communicated. The monitoring and notification system 20 communicates with the communications network 22 and sends the notification (shown as reference numeral 24 in FIGS. 1–3). The notification alerts personnel when the first air conditioning system 18 and/or the second air conditioning system 26 operates, fails, or experiences a fault. As FIG. 4 shows, the communications network 22 may include a pager network 28. The pager network 28 sends a page notification 30 to alert field personnel. The communications network 22 may include the Public Switched Telephone Network 32. The monitoring and notification system 20 could be programmed to call a telephone number and provide a telephone call notification 34. The monitoring and notification system 20 could similarly access a mobile telephone network 36 through the Public Switched Telephone Network 32. The monitoring and notification system 20 could call a mobile telephone number and provide a mobile telephone call notification 38. The communications network 22 itself could communicate an email notification 40. The email notification 40 could also be communicated over the Public Switched Telephone Network 32 to a globally-distributed communication network (e.g., the "Internet").

Figure 5:
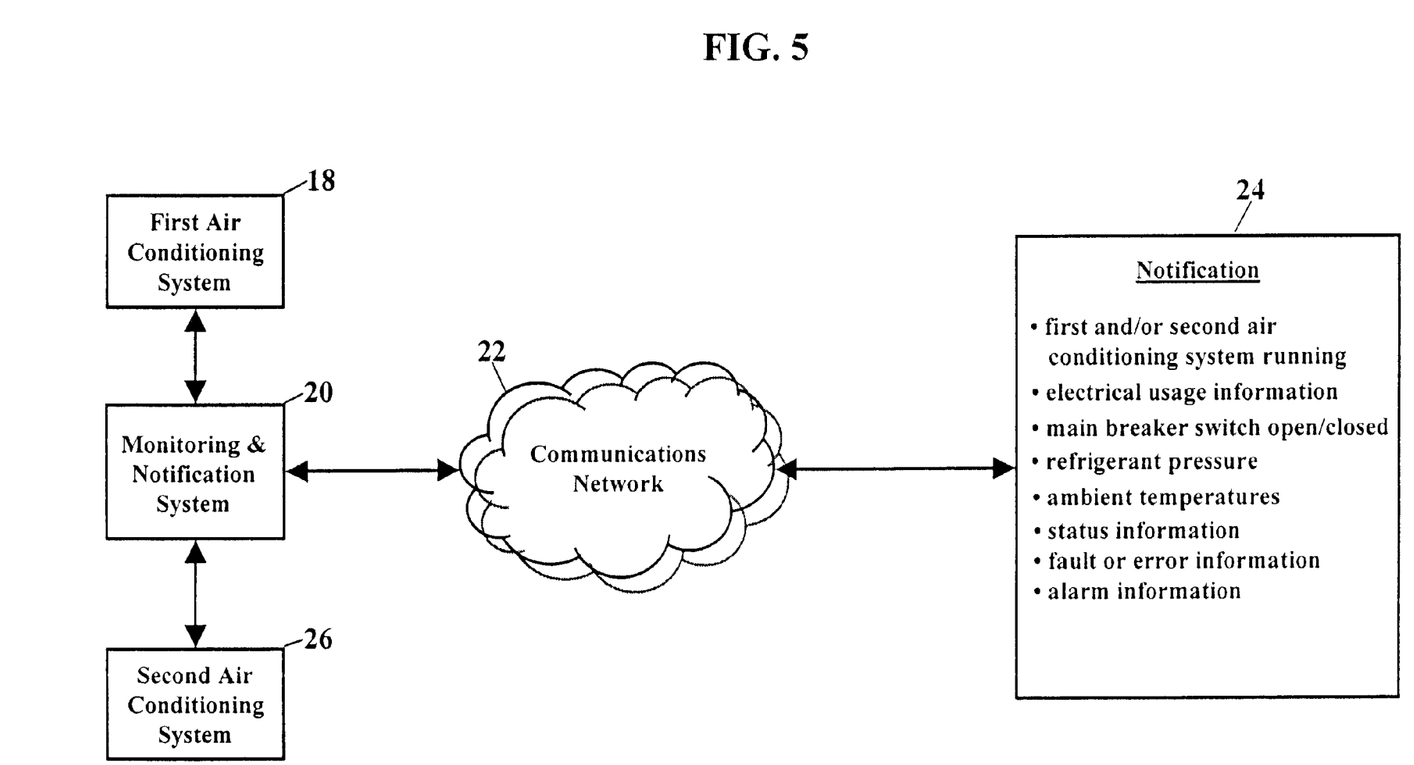
FIG. 5 is a schematic drawing representing the content of the notification.

FIG. 5 is a schematic drawing representing the content of the notification 24. The monitoring and notification system 20 monitors at least one of the first air conditioning system 18 and the second air conditioning system 26. The monitoring and notification system 20 communicates with the communications network 22 and sends the notification 24. The notification 24 could communicate any information useful for monitoring the operation of the first air conditioning system 18 and the second air conditioning system 26. The notification 24, for example, may simply communicate whether the first air conditioning system 18 and/or the second air conditioning system 26 is running. If the monitoring and notification system 20 monitors the electrical usage, then the notification 24 could also communicate electrical usage information. The notification 24 could also communicate whether the first air conditioning system 18 or the second air conditioning system 26 is receiving electrical power, thus indicating a main breaker switch is open or closed. The monitoring and notification system 20 could also monitor refrigerant pressures, so the notification 24 could include refrigerant pressure information. If refrigerant pressures are low, the notification could indicate a leak in a condenser/evaporator coil. The monitoring and notification system 20 could monitor ambient temperatures, so the notification 24 could alert field personnel to unusual cold weather operation. If, for example, either the first air conditioning system 18 or the second air conditioning system 26 is operating during cold ambient temperatures, the notification 24 may indicate ice is forming on the condenser. The notification 24, in short, may include any status information, fault or error information, alarm information, or any other information useful for monitoring the operation of the first air conditioning system 18 and the second air conditioning system 26.

Figure 6:
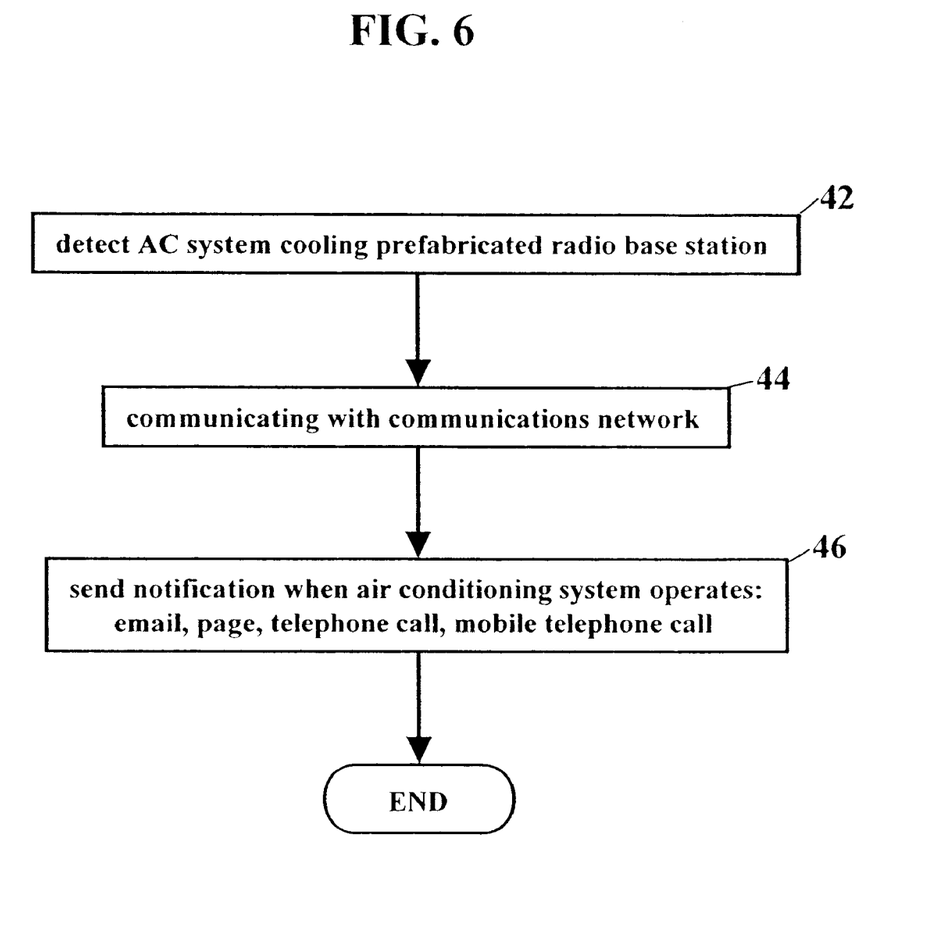
FIG. 6 describes a process for notifying personnel when an air conditioning system cools a prefabricated radio base station.

FIG. 6 describes a process for notifying personnel when an air conditioning system cools a prefabricated radio base station. The process detects when the air conditioning system cools the prefabricated radio base station (Block 42). If operation of the air conditioning system is detected, the process describes communicating with a communications network (Block 44) and sending a notification (Block 46). The notification includes at least one of an email, a page, a telephone call, and a mobile telephone call. The notification alerts the personnel that the air conditioning system is cooling the radio base station.

Figure 7:
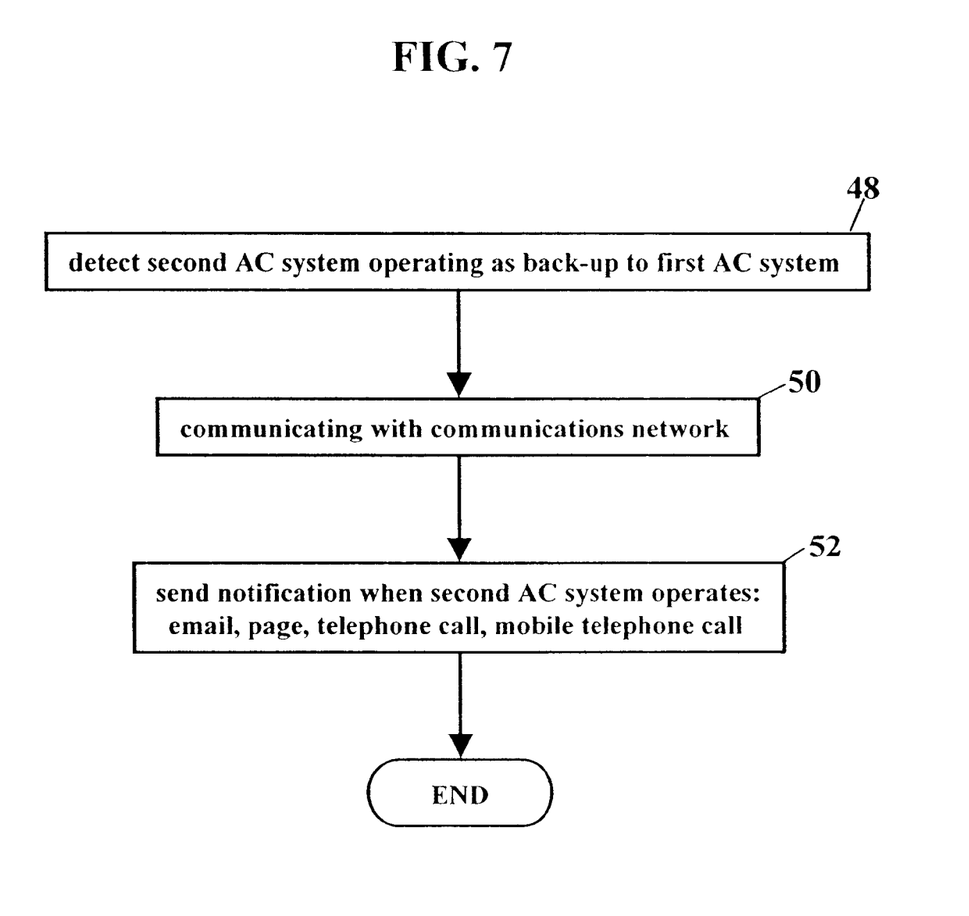
FIG. 7 describes another process for notifying personnel when an air conditioning system cools a prefabricated radio base station.

FIG. 7 describes another process for notifying personnel when an air conditioning system cools a prefabricated radio base station. Here the process detects when a second air conditioning system operates to cool the prefabricated radio base station (Block 48). The second air conditioning system operates as a back-up to a first air conditioning system. If the second air conditioning system is operating, the process communicates with a communications network (Block 50) and sends a notification when the second air conditioning system operates (Block 52). The notification includes at least one of an email, a page, a telephone call, and a mobile telephone call. The notification alerts the personnel that the second air conditioning system is operating, thus indicating a potential problem with the first air conditioning system.

EXAMPLE

Figure 8:
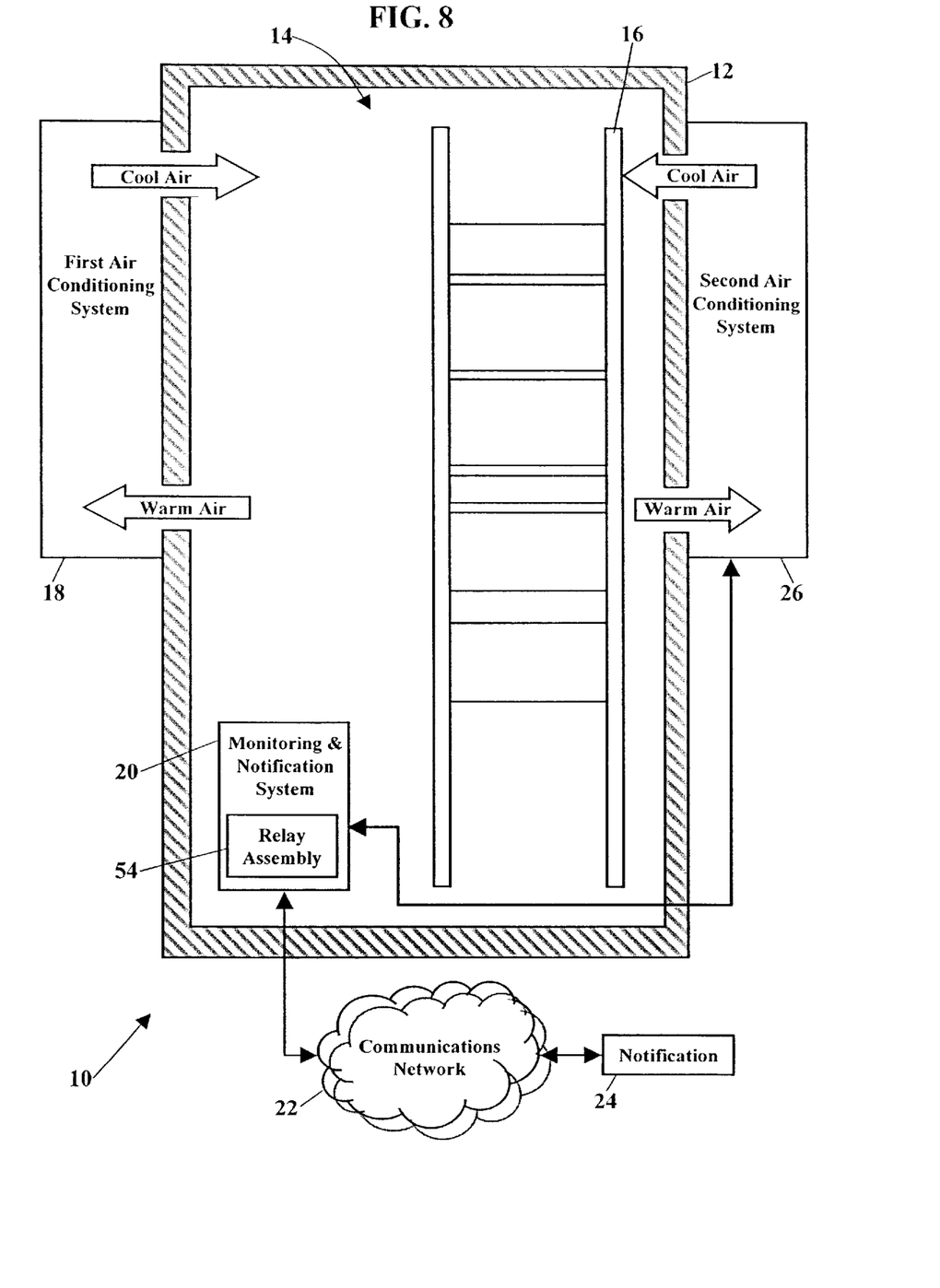
FIGS. 8–10 are schematic drawings showing a non-limiting example of the radio base station.
Figure 9:
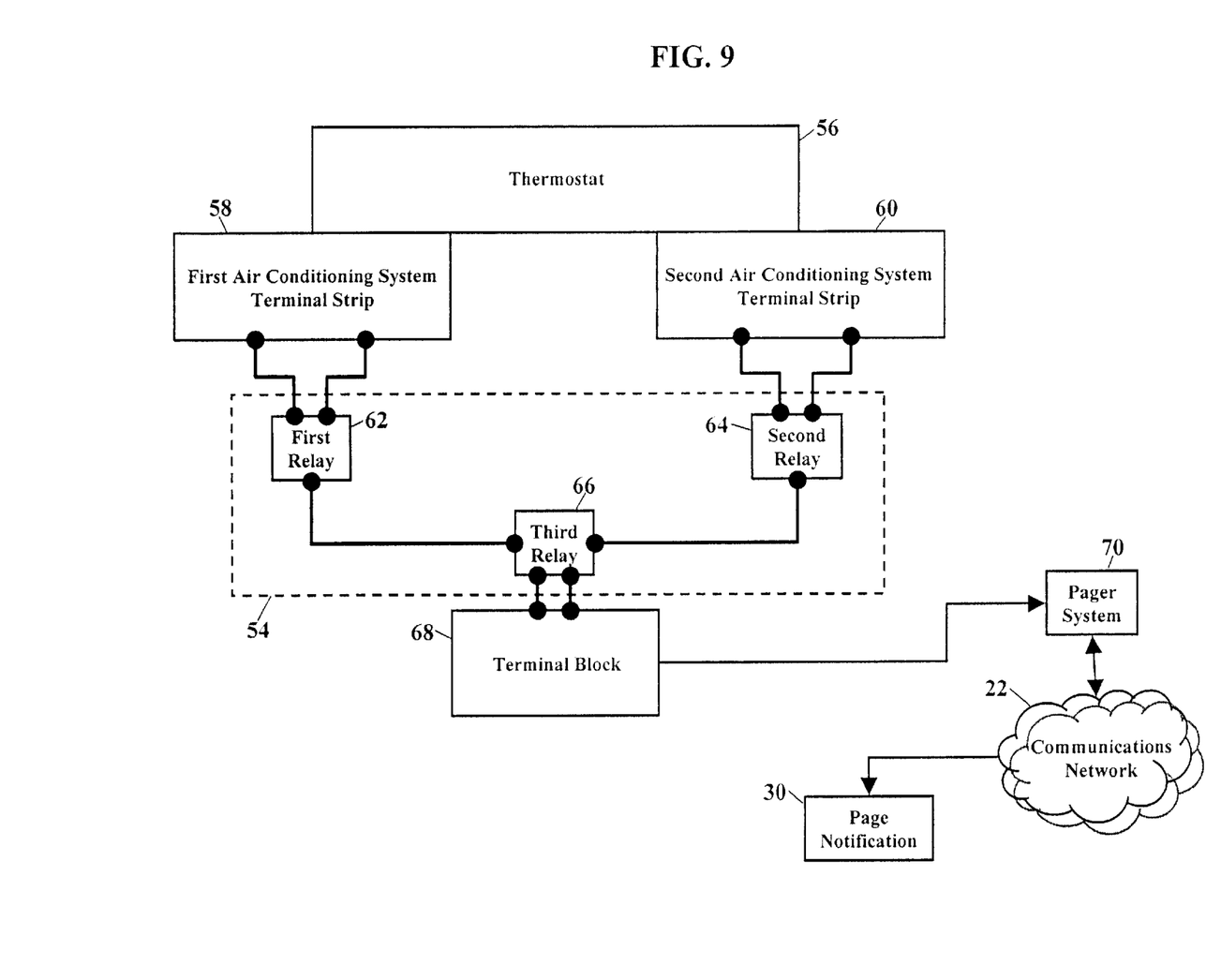
Figure 10:
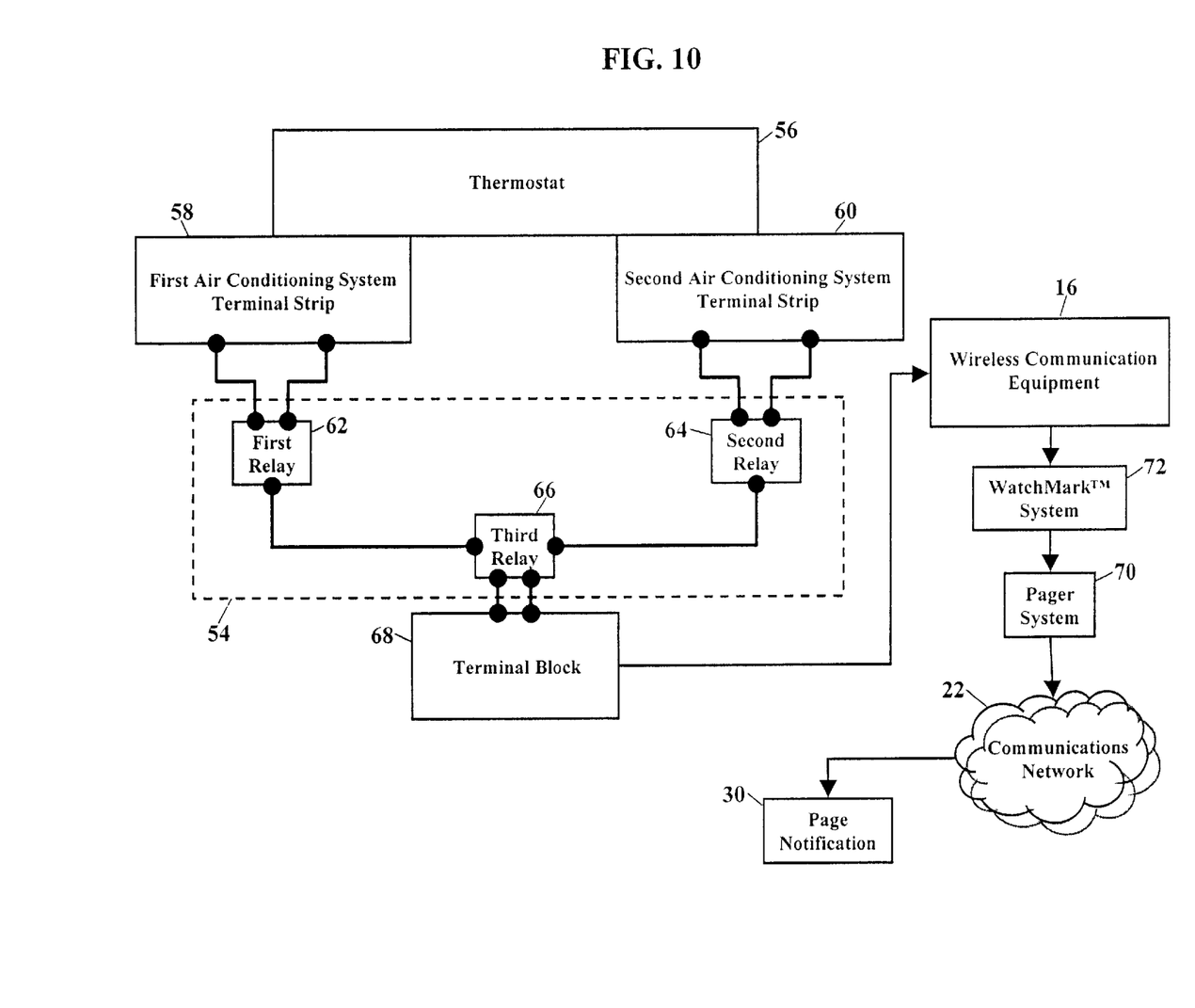

The Radio Base Station 10 is further illustrated by the following non-limiting example. FIGS. 8–10 are schematic drawings showing this particular non-limiting example. FIG. 8 is a sectional view of the radio base station 10 exposing the rack-mounted wireless communication equipment 16. The wireless communication equipment 16 is housed within the interior region 14 of the enclosure 12. The first air conditioning system 18, and the second air conditioning system 26, cool the interior region 14 of the enclosure 12. The monitoring and notification system 20 of this non-limiting example only monitors the second air conditioning system 26. The monitoring and notification system 20 communicates with the communications network 22 and sends the notification 24 when the second air conditioning system 26 operates, fails, or experiences a fault. Because the monitoring and notification system 20 only monitors the second air conditioning system 26, this non-limiting example utilizes the "lead-lag" operating scenario. The first air conditioning system 18 is the "lead" unit, while the second air conditioning system 26 is the "lag" unit. As FIG. 9 further explains, the monitoring and notification system 20 uses a relay assembly 54 to monitor the operation of the second air conditioning system 26.

FIG. 9 is a schematic drawing further describing the non-limiting example. The relay assembly 54 is used to determine when the second air conditioning system operates as a back-up in the lead-lag scenario. A thermostat 56 controls the operation of the first air conditioning system and the second air conditioning system (shown, respectively, as reference numerals 18 and 26 in FIGS. 2, 3, and 8). The thermostat 56 has switched terminal strips that provide electrical power to the first air conditioning system and the second air conditioning system. When the thermostat 56 wants to initiate operation of the first air conditioning system, the thermostat 56 provides electrical power to a first air conditioning system terminal strip 58. When the thermostat 56 needs to initiate operation of the second air conditioning system, the thermostat 56, likewise, provides electrical power to a second air conditioning system terminal strip 60. When the thermostat 56 detects that a cooling cycle is required, the thermostat 56 applies electrical power to either the first air conditioning system terminal strip 58 and/or the second air conditioning system terminal strip 60.

The relay assembly 54 determines when the second air conditioning system operates as a back-up. A first relay 62 is coupled to the first air conditioning system terminal strip 58, while a second relay 64 is coupled to the second air conditioning system terminal strip 60. The first relay 62 and the second relay 64 are each coupled to a third relay 66. If the thermostat 56 applies electrical power to both the first air conditioning system terminal strip 58 and the second air conditioning system terminal strip 60, then the first air conditioning system 18 must be experiencing a problem (e.g., high heat load or failure). The first relay 62 and the second relay 64 each receive electrical power, and the third relay 66, in turn, is forced to electromechanically couple to a terminal block 68. The third relay 66, therefore, sends a voltage signal into the terminal block 68. This voltage signal initiates a pager system 70. The pager system 70, in response, communicates with the communications network 22 and sends the page notification 30. The page notification 30 could be sent to any desired recipient. The page notification 30, for example, could be sent to a field engineer/technician, an air conditioning repair specialist, and/or a network operations facility.

FIG. 10 is a schematic drawing describing a variation to the non-limiting example. Here the terminal block 68 couples a voltage signal to the wireless communication equipment 16. A WATCHMARK™ CONTROL™ system 72 monitors the wireless communication equipment 16 (WATCHMARK and CONTROL are trademarks of Watchmark Corporation, 13431 NE 20th St., Bellevue, Wash. 98005 USA, (425) 564-8000, www.watchmark.com). The WATCHMARK™ CONTROL™ system 72 is programmed to trigger an action in response to the voltage signal. The WATCHMARK™ CONTROL™ system 72, for example, may be programmed to page personnel when the voltage signal is detected. The WATCHMARK™ CONTROL™ system 72, then, initiates the pager system 70. The pager system 70 communicates with the communications network 22 and sends the page notification 30.

Those of ordinary skill in the art of wireless communication will recognize the present invention is broadly applicable to wireless communication equipment and techniques. The present invention, first, is applicable to any manufacturer's radio base station design. The present invention, second, is applicable to radio base stations utilizing code-division multiple access (CDMA) technologies, time-division multiple access (TDMA) technologies, and the global system for mobile communications (GSM) technology. The present invention is also compatible with the June, 2000 World Radiocommunication Conference agreement on third-generation cellular telephony (806–960 MHz, 1710–1885 MHz, and 2500–2690 MHz). Radio base stations transmitting and receiving radio frequencies, such as the industrial, scientific, and medical (ISM) band of the electromagnetic spectrum (2.4 GHz–2.5 GHz) (e.g, "Bluetooth"), are also applicable.

While this invention has been described with respect to various features, aspects, and embodiments, those skilled and unskilled in the art will recognize the invention is not so limited. Other variations, modifications, and alternative embodiments may be made without departing from the spirit and scope of the following claims.

What is claimed is:

1. A prefabricated radio base station for a wireless communication system, comprising:
    wireless communication equipment for receiving, processing, and transmitting frequencies in at least one range of 806–960 MHz, 1710–1855 MHz, 2500–2690 MHz, and 2.4 GHz–2.5 GHz;
    an enclosure housing the wireless communication equipment;
    a first air conditioning system cooling the wireless communication equipment;
    a second air conditioning system cooling the wireless communication equipment in response to a failure of the first air conditioning system; and
    a monitoring and notification system including a relay assembly coupled to both the first and second air conditioning systems, the relay assembly sensing a voltage signal from the second air conditioning system and determining when the second air conditioning system operates, the monitoring and notification system communicating with a communications network and programmed to send a notification in response to the sensed voltage signal,
    wherein the monitoring and notification system provides an alert when the second air conditioning system is cooling the wireless communication equipment.

2. A prefabricated radio base station according to claim 1, wherein the monitoring and notification system communicates with a pager network and sends a page notification when the air conditioning system operates.

3. A prefabricated radio base station according to claim 1, wherein the monitoring and notification system communicates with the communications network and sends an email notification when the air conditioning system operates.

4. A prefabricated radio base station according to claim 1, wherein the monitoring and notification system communicates with a telephone network and sends a call notification when the air conditioning system operates.

5. A prefabricated radio base station according to claim 1, wherein the monitoring and notification system communicates with a mobile telephone network and sends a call notification when the air conditioning system operates.

6. A prefabricated radio base station according to claim 1, wherein the monitoring and notification system monitors the air conditioning system and provides real-time information on the operation of the air conditioning system.

7. A prefabricated radio base station according to claim 1, wherein the monitoring and notification system sends at least one of electrical usage information, main breaker information, refrigerant information, and ambient temperature information regarding the air conditioning system.

8. A prefabricated radio base station according to claim 1, wherein the monitoring and notification system sends status information, fault information, error information, and alarm information regarding the air conditioning system.

9. A prefabricated radio base station for a wireless communication system, comprising:
    wireless communication equipment for receiving, processing, and transmitting frequencies in at least one range of 806–960 MHz, 1710–1855 MHz, 2500–2690 MHz, and 2.4 GHz–2.5 GHz;
    an enclosure housing the wireless communication equipment;
    a first air conditioning system cooling the wireless communication equipment;
    a second air conditioning system cooling the wireless communication equipment; and
    a monitoring and notification system monitoring at least one of the first air conditioning system and the second air conditioning system, the monitoring and notification system communicating with a communications network and programmed to send a notification when at least one of i) the first air conditioning system operates and ii) the second air conditioning system operates,
    wherein the monitoring and notification system provides an alert when the wireless communication equipment is cooled, and the monitoring and notification system includes a relay assembly; and
    wherein the relay assembly includes a first relay coupled to the first air conditioning system, a second relay coupled to the second air conditioning system and a delay coupled both the first and second relays, the delay senses a signal from at least one of the first and second relays and provides the sensed signal to the communications network as the alert.

10. A prefabricated radio base station according to claim 9, wherein the monitoring and notification system communicates with a pager network and sends a page notification when at least one of i) the first air conditioning system operates and ii) the second air conditioning system operates.

11. A prefabricated radio base station according to claim 9, wherein the monitoring and notification system communicates with the communications network and sends an email notification when at least one of i) the first air conditioning system operates and ii) the second air conditioning system operates.

12. A prefabricated radio base station according to claim 9, wherein the monitoring and notification system communicates with a telephone network and sends a call notification when at least one of i) the first air conditioning system operates and ii) the second air conditioning system operates.

13. A prefabricated radio base station according to claim 9, wherein the monitoring and notification system communicates with a mobile telephone network and sends a call notification when at least one of i) the first air conditioning system operates and ii) the second air conditioning system operates.

14. A prefabricated radio base station according to claim 9, wherein the monitoring and notification system sends at least one of electrical usage information, main breaker information, refrigerant information, and ambient temperature information regarding the first air conditioning system.

15. A prefabricated radio base station according to claim 9, wherein the monitoring and notification system sends status information, fault information, error information, and alarm information regarding the first air conditioning system.

16. A prefabricated radio base station according to claim 9, wherein the monitoring and notification system sends at least one of electrical usage information, main breaker information, refrigerant information, and ambient temperature information regarding the second air conditioning system.

17. A prefabricated radio base station according to claim 9, wherein the monitoring and notification system sends status information, fault information, error information, and alarm information regarding the second air conditioning system.

18. A prefabricated radio base station for a wireless communication system, comprising:

wireless communication equipment for receiving, processing, and transmitting frequencies in at least one range of 806–960 MHz, 1710–1855 MHz, 2500–2690 MHz, and 2.4 GHz–2.5 GHz;

an enclosure housing the wireless communication equipment;

a first air conditioning system cooling the wireless communication equipment;

a second air conditioning system cooling the wireless communication equipment; and a monitoring and notification system monitoring at least one of the first air conditioning system and the second air conditioning system, the monitoring and notification system communicating with a communications network and programmed to send a notification when at least one of i) the first air conditioning system operates and ii) the second air conditioning system operates, the notification comprising at least one of an email, a page, a telephone call, and a mobile telephone call, wherein the monitoring and notification system provides an alert when the wireless communication equipment is cooled, and the monitoring and notification system includes a relay assembly; and wherein the relay assembly includes a first relay coupled to the first air conditioning system, a second relay coupled to the second air conditioning system and a delay coupled both the first and second relays, the delay senses a signal from at least one of the first and second relays and provides the sensed signal to the communications network as the alert.

19. A prefabricated radio base station for a wireless communication system, comprising:

wireless communication equipment for receiving, processing, and transmitting frequencies in at least one range of 806–960 MHz, 1710–1855 MHz, 2500–2690 MHz, and 2.4 GHz–2.5 GHz;

an enclosure housing the wireless communication equipment;

a first air conditioning system cooling the wireless communication equipment;

a second air conditioning system cooling the wireless communication equipment, in response to a failure of the first air conditioning system;

a monitoring and notification system monitoring the second air conditioning system, the monitoring and notification system communicating with a communications network and programmed to send a notification when the second air conditioning system operates, wherein the monitoring and notification system provides an alert when the second air conditioning system cools the wireless communication equipment, and the monitoring and notification system includes a relay assembly; and wherein the relay assembly includes a first relay coupled to the first air conditioning system, a second relay coupled to the second air conditioning system and a delay coupled both the first and second relays, the delay senses a signal from the second relay and provides the sensed signal to the communications network as the alert.

20. A prefabricated radio base station according to claim 19, wherein the monitoring and notification system communicates with a pager network and sends a page notification when the second air conditioning system operates.

21. A prefabricated radio base station according to claim 19, wherein the monitoring and notification system communicates with the communications network and sends an email notification when the second air conditioning system operates.

22. A prefabricated radio base station according to claim 19, wherein the monitoring and notification system communicates with a telephone network and sends a call notification when the second air conditioning system operates.

23. A prefabricated radio base station according to claim 19, wherein the monitoring and notification system communicates with a mobile telephone network and sends a call notification when the second air conditioning system operates.

24. A prefabricated radio base station according to claim 19, wherein the monitoring and notification system sends at least one of electrical usage information, main breaker information, refrigerant information, and ambient temperature information regarding the second air conditioning system.

25. A prefabricated radio base station according to claim 19, wherein the monitoring and notification system sends status information, fault information, error information, and alarm information regarding the second air conditioning system.

26. A prefabricated radio base station for a wireless communication system, comprising:

wireless communication equipment for receiving, processing, and transmitting frequencies in at least one range of 806–960 MHz, 1710–1855 MHz, 2500–2690 MHz, and 2.4 GHz–2.5 GHz;

an enclosure housing the wireless communication equipment;

a first air conditioning system cooling the wireless communication equipment;

a second air conditioning system cooling the wireless communication equipment in response to a failure of the first air conditioning system;

a monitoring and notification system monitoring the second air conditioning system, the monitoring and notification system communicating with a communications network and programmed to send a notification when the second air conditioning system operates, the notification comprising at least one of an email, a page, a telephone call, and a mobile telephone call, wherein the monitoring and notification system provides an alert when the second air conditioning system cools the wireless communication equipment, and the monitoring and notification system includes a relay assembly; and wherein the relay assembly includes a first relay coupled to the first air conditioning system, a second relay coupled to the second air conditioning system and a delay coupled both the first and second relays, the delay senses a signal from the second relay and provides the sensed signal to the communications network as the alert.

27. A process of notifying personnel when an air conditioning system cools a prefabricated radio base station, the process comprising:

applying an electric power to first and second air conditioning systems;

detecting when one of first and second air conditioning systems cools the prefabricated radio base station by sensing a voltage signal from one of the first and second air conditioning systems, the prefabricated radio base station comprising an enclosure housing wireless communication equipment for receiving, processing, and transmitting frequencies in at least one range of 806–960 MHz, 1710–1855 MHz, 2500–2690 MHz, and 2.40 Hz–2.5 GHz; and communicating with a communications network and sending a notification in response to the sensed voltage signal, the notification comprising at least one of an email, a page, a telephone call, and a mobile telephone call, wherein the notification alerts the personnel that one of the first and second air conditioning systems is cooling the radio base station.

28. A process of notifying personnel when an air conditioning system cools a prefabricated radio base station, the process comprising:

applying an electric power to first and second air conditioning systems, the second air conditioning system operating in response to a failure of the first air conditioning system;

sensing a voltage signal from the second air conditioning system;

determining when the first air conditioning system is failed and when the second air conditioning system operates to cool the prefabricated radio base station, the prefabricated radio base station comprising an enclosure housing wireless communication equipment for receiving, processing, and transmitting frequencies in at least one range of 806–960 MHz, 1710–1355 MHz, 2500–2690 MHz, and 2.4 GHz–2.5 GHz; and communicating with a communications network and sending a notification when in response to the sensed voltage signal, the notification comprising at least one of an email, a page, a telephone call, and a mobile telephone call, wherein the notification alerts the personnel that the second air conditioning system is operating, thus indicating a potential problem with the first air conditioning system.

* * * * *